US009140777B2

(12) United States Patent
Calvarese

(10) Patent No.: US 9,140,777 B2
(45) Date of Patent: Sep. 22, 2015

(54) ULTRASONIC LOCATIONING USING ENROLLMENT MODE

(71) Applicant: Symbol Technologies, Inc., Schaumburg, IL (US)

(72) Inventor: Russell E. Calvarese, Stony Brook, NY (US)

(73) Assignee: Symbol Technologies, LLC, Holtsville, NY (US)

(*) Notice: Subject to any disclaimer, the term of this patent is extended or adjusted under 35 U.S.C. 154(b) by 396 days.

(21) Appl. No.: 13/893,509

(22) Filed: May 14, 2013

(65) Prior Publication Data

US 2014/0340994 A1 Nov. 20, 2014

(51) Int. Cl.
| | | |
|---|---|---|
| *G01S 1/72* | (2006.01) | |
| *G01S 5/18* | (2006.01) | |
| *G01S 5/30* | (2006.01) | |
| *G01S 11/14* | (2006.01) | |
| *G01S 11/16* | (2006.01) | |

(52) U.S. Cl.
CPC . *G01S 5/18* (2013.01); *G01S 1/725* (2013.01); *G01S 5/30* (2013.01); *G01S 11/14* (2013.01); *G01S 11/16* (2013.01)

(58) Field of Classification Search
CPC ........... G01S 5/18; G01S 11/14; G01S 1/725; G01S 1/74
USPC ........................................................ 367/117
See application file for complete search history.

(56) References Cited

U.S. PATENT DOCUMENTS

| | | | | |
|---|---|---|---|---|
| 6,459,989 | B1* | 10/2002 | Kirkpatrick et al. | 701/470 |
| 8,000,649 | B2* | 8/2011 | Shiff et al. | 455/11.1 |
| 2007/0133352 | A1 | 6/2007 | Kim et al. | |
| 2009/0190441 | A1* | 7/2009 | Zhao et al. | 367/128 |
| 2009/0273465 | A1 | 11/2009 | Shamir et al. | |
| 2009/0295639 | A1* | 12/2009 | Zhao et al. | 342/387 |
| 2010/0182875 | A1* | 7/2010 | McFarland | 367/127 |

(Continued)

FOREIGN PATENT DOCUMENTS

| | | |
|---|---|---|
| GB | 2367618 A | 4/2002 |
| WO | 2012114304 A1 | 8/2012 |
| WO | 2013008169 A1 | 1/2013 |

OTHER PUBLICATIONS

International Search Report and Written Opinion mailed Apr. 9, 2014 in counterpart PCT application No. PCT/US14/35784.

(Continued)

*Primary Examiner* — Mark Hellner

(57) ABSTRACT

An ultrasonic locationing method and system for ultrasonic locationing of a mobile device within an environment includes a plurality of fixed ultrasonic emitters to transmit an instruction to listen for an enrollment tone to at least one communication device, and to sequentially emit an enrollment tone from each emitter at specific times to be received by those communication devices that implemented the instruction. A controller receives a response from each of those communication devices, the respective response including an identity of the communication device, a time the enrollment tone was received, and an indication of a hardware platform of the communication device. The controller can then assign a locationing mode to each communication device in accordance with its hardware platform. The communication device provides locationing information using its assigned locationing mode and locationing tones from active emitters.

17 Claims, 3 Drawing Sheets

(56) References Cited

U.S. PATENT DOCUMENTS

2011/0018687 A1   1/2011  Holm
2012/0295639 A1* 11/2012  Fitoussi et al. ............. 455/456.3
2013/0010617 A1*  1/2013  Chen et al. ................... 370/252

OTHER PUBLICATIONS

Holm, "Ultrasound Positioning Based on Time-of-Flight and Signal Strength" 2012 International Conference on Indoor Positioning and Indoor Navigation, Nov. 13-15, 2012.

* cited by examiner

ULTRASONIC LOCATIONING USING ENROLLMENT MODE

BACKGROUND

An ultrasonic receiver can be used to determine its location with reference to one or more ultrasonic emitters, such as locating a mobile device having an ultrasonic receiver and being present within a retail, factory, warehouse, or other indoor environment, for example. The ultrasonic emitter(s) can transmit ultrasonic energy in a short burst which can be received by an ultrasonic transducer (audio microphone) in the ultrasonic receiver. The use of several ultrasonic emitters distributed within the environment can be used to provide a specific location of a particular device using techniques known in the art such as measuring time-of-flight or signal strength of the emitter signals and using triangulation, trilateration, and the like, as have been used in radio frequency locationing systems.

However, emitters may not always be in the line-of-sight of the mobile device, and typical emitter signals may not be strong enough to directly penetrate through obstacles very well, such that reflected signals reach the mobile device better than the direct signal. This leads to inaccurate locationing results. In addition, having many mobile devices trying to establish their position within the environment, and interacting with all the emitters in the environment cannot be done simultaneously due to the interference, which results in a poor position update rate.

One solution for locationing uses time-slicing, where each emitter can send its ultrasonic burst, and there is a wait time for any echoes to settle before the subsequent ultrasonic bursts are sent. This method solves the interference problem, but still results in a poor update rate, and does not resolve the non-line-of-sight inaccuracy issue.

Another solution for locationing could use more ultrasonic bandwidth, where a larger range of ultrasonic frequencies can be used. However, today's mobile devices have a very limited ability to hear ultrasonic frequencies, typically between 19-22 kHz. Therefore, the only way to expand usable bandwidth would be to replace the existing audio circuitry of the mobile device to operate on higher frequencies, which is cost prohibitive. Alternatively, the usable frequencies could be expanded down into the audio range, but this would become disruptive to the users.

Accordingly, there is a need for a technique to locate a mobile device in an indoor environment without modifying the phone hardware and while eliminating the aforementioned issues. Furthermore, other desirable features and characteristics of the present invention will become apparent from the subsequent detailed description and the appended claims, taken in conjunction with the accompanying drawings and the foregoing background.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
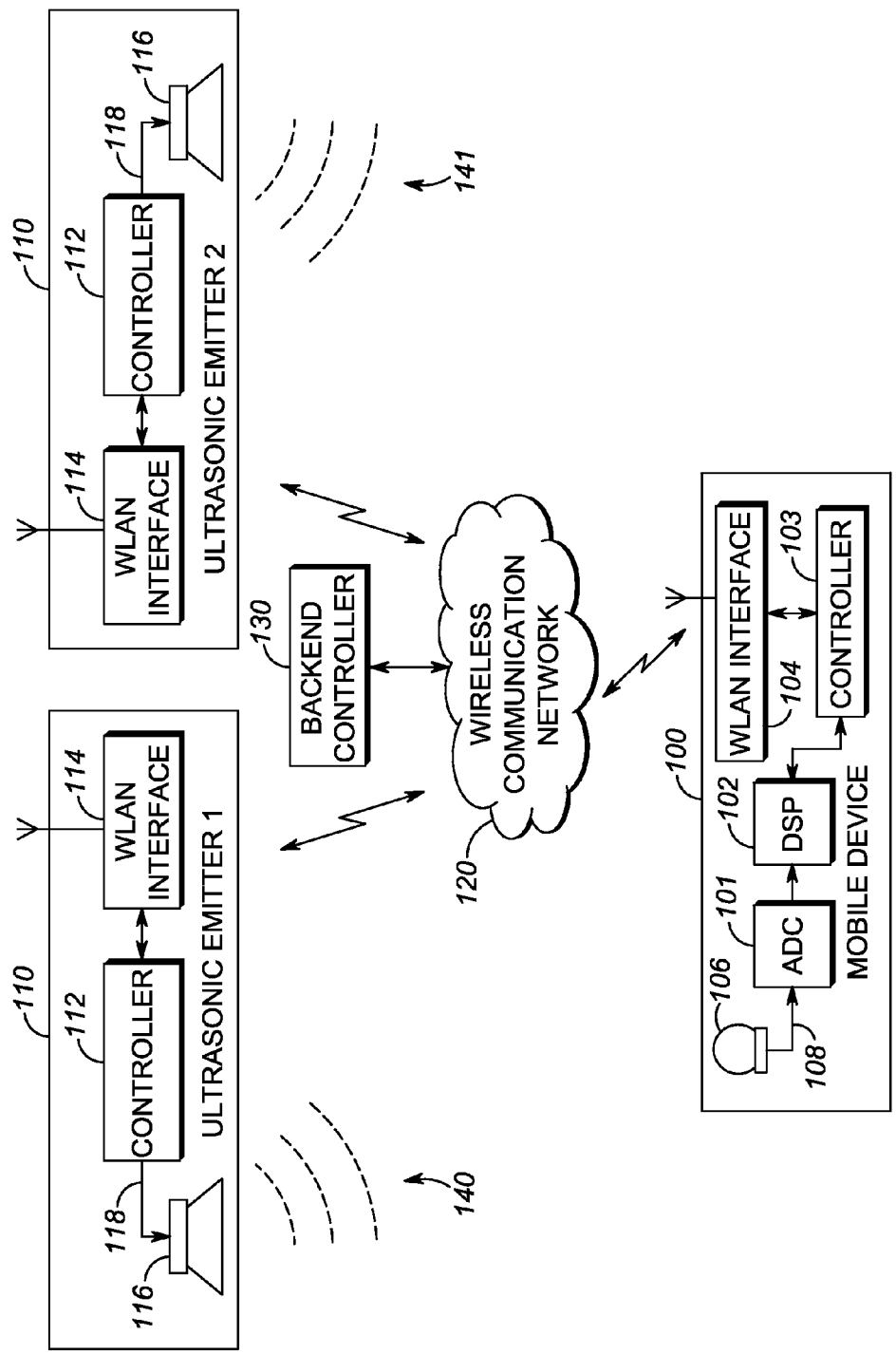
FIG. 1 is a simplified block diagram of an ultrasonic locationing system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, an improved technique is described to locate a mobile device in an indoor environment without modifying the phone hardware and while eliminating problems associated with non-line-of-sight issues, bandwidth limitations, interference, and a poor position update rate, as will be detailed below.

The device to be located can include a wide variety of business and consumer electronic platforms such as cellular radio telephones, mobile stations, mobile units, mobile nodes, user equipment, subscriber equipment, subscriber stations, mobile computers, access terminals, remote terminals, terminal equipment, cordless handsets, gaming devices, smart phones, personal computers, and personal digital assistants, and the like, all referred to herein as a communication device. Each device comprises a processor that can be further coupled to a keypad, a speaker, a microphone, audio circuitry, a display, signal processors, and other features, as are known in the art and therefore not shown or described in detail for the sake of brevity.

Various entities are adapted to support the inventive concepts of the embodiments of the present invention. Those skilled in the art will recognize that the drawings herein do not depict all of the equipment necessary for system to operate but only those system components and logical entities particularly relevant to the description of embodiments herein. For example, routers, controllers, servers, switches, access points/ports, and wireless clients can all includes separate communication interfaces, transceivers, memories, and the like, all under control of a processor. In general, components such as processors, transceivers, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, and/or expressed using messaging logic flow diagrams.

Thus, given an algorithm, a logic flow, a messaging/signaling flow, and/or a protocol specification, those skilled in the art are aware of the many design and development techniques available to implement one or more processors that perform the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

FIG. 1 is a block diagram of an ultrasonic locationing system, in accordance with the present invention. A plurality of ultrasonic transponders such as a piezoelectric speaker or emitter 116 can be implemented within the environment. Each emitter can send a short burst of ultrasonic sound (e.g. 140, 141) within the environment. The mobile device 100 can include a digital signal processor 102 to process the ultrasonic signal 140 received by a transponder such as a microphone 106, and specifically the frequency components of the signals 140, 141 from the ultrasonic emitters 116 in accordance with the present invention.

The microphone 106 provides electrical signals 108 to receiver circuitry including a signal processor 102. It is envisioned that the mobile device can use existing audio circuitry with sampling frequencies up to 44.1 kHz, i.e. the typically utilized Nyquist frequency for commercial audio devices, which relates to a 22.05 kHz usable upper frequency limit for processing audio signals. It is envisioned that the mobile device receiver circuitry is implemented in the digital domain using an analog-to-digital converter 101 coupled to a digital signal processor 102, for example. It should be recognized that other components, including amplifiers, digital filters, and the like, are not shown for the sake of simplicity of the drawings. For example, the microphone signals 108 can be amplified in an audio amplifier after the microphone 106.

The processor 102 can also be coupled to a controller 103 and wireless local area network interface 104 for wireless communication with other devices, and controllers 130 in the communication network 120. Each emitter 110 can be coupled to its own controller 112 and wireless local area network interface 114 for wireless communication with the server or backend controller 130 in the communication network 120. Alternatively, either or both of the mobile device 100 and emitters 110 could be connected to the communication network 120 through a wired interface connection (not represented), such as an Ethernet interface connection. The wireless communication network 120 can include local and wide-area wireless networks, wired networks, or other IEEE 802.11 wireless communication systems, including virtual and extended virtual networks. However, it should be recognized that the present invention can also be applied to other wireless communication systems. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

The controller 112 of each ultrasonic emitter 110 provides the speaker 116 with a frequency tone 140, 141 to emit in an ultrasonic burst 140. The speaker will broadcast the burst with a duration of 200 milliseconds or less. The particular tone frequency and burst timing to be used by each emitter 110 can be directed by the backend controller 130 via the network 120. The emitters are configured to have usable output across about a 19-22 kHz frequency range.

The processor 102 of the mobile device 100 is operable to discern the particular frequency of the tone received in its microphone signal 108. The tone is broadcast at a frequency within the frequency range of about 19-22 kHz to enable the existing mobile device processor 102 analyze the burst in the frequency domain to detect the tone. The 19-22 kHz range has been chosen such that the existing audio circuitry of the mobile device will be able to detect ultrasonic tones without any users within the environment hearing the tones. In addition, it is envisioned that there is little audio noise in the range of 19-22 kHz to interfere with the ultrasonic tones.

It is envisioned that the processor 102 of the mobile device will use a Fast Fourier Transform (FFT) to discern the burst tones for RSSI measurements in the frequency domain. A Goertzel algorithm can be used to detect timing for flight time measurements. The present invention operates within a limited ultrasonic frequency range of 19-22.05 kHz. Given that the pulse duration needs to be very short for accuracy, and due to limited smart phone capabilities, only one or two different high sound pressure level (SPL) frequencies can be used before they overlap within this frequency range. Also, due to Doppler shifts that can occur with a mobile device, guard bands between specific frequencies must be used, and therefore the amount of discernible frequency tones that can be accurately recognized within this range is limited. In the ultrasonic band of interest (19 kHz to 22.05 kHz), it is only possible to distinguish four or five distinct tones while still leaving room for as much as +/−125 Hz of Doppler shift (enough margin to accommodate that which would be present from a very fast walking speed).

Each ultrasonic burst should last on the order of 200 ms in duration and will have a high SPL. This will provide a signal capable of penetrating intervening objects (e.g. shelving) directly to the mobile device, even if the emitter is not in a line-of-sight of the mobile device. Also, this will allow the FFT processing to collect enough samples to provide a definitive tone identification.

Each emitter is configured to broadcast the burst over a limited coverage area or region. For unobtrusiveness and clear signaling, the emitters can be affixed to a ceiling of the environment, where the position and coverage area of each emitter is known and fixed, with the emitter oriented to emit a downward burst towards a floor of the environment, such that the burst from an emitter is focused to cover only a limited, defined floor space or region of the environment, as will be detailed below.

Figure 2:
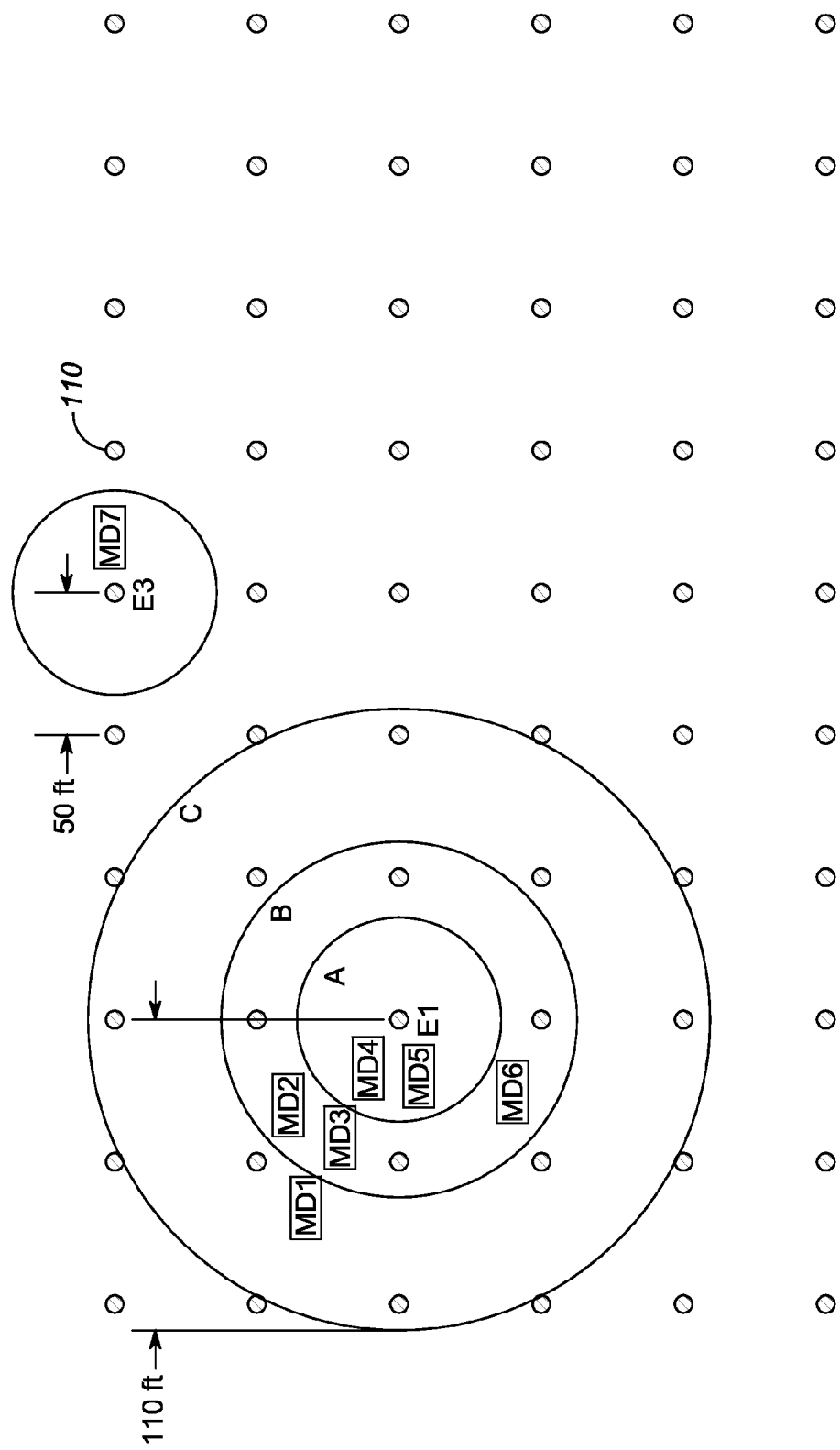
FIG. 2 is a graphical representation of emitters and their respective coverage regions in an indoor environment, in accordance with some embodiments of the present invention.

In practice, and referring to FIG. 2, it has been determined that one emitter in a typical retail environment can provide a coverage area of about fifty feet square. Therefore, a plurality of emitters 110 is provided to completely cover an indoor environment, and these emitters are spaced in a grid about fifty feet apart. A mobile device (e.g. MD 1) that enters the environment and associates to the wireless local area network (WLAN) of the backend controller, and is provided a software application to implement the locationing techniques described herein, in accordance with the present invention.

For locationing purposes, the backend controller can direct specific emitters to emit their bursts at particular times. The present invention provides that emitters in neighboring regions do not emit their ultrasonic burst at the same time, to avoid interference, although emitters in non-neighboring regions can emit their ultrasonic burst at the same time if there is minimum interferences therebetween. Different frequencies, groups of frequencies, burst durations, and burst timings can be used by each emitter. A mobile communication device can receive these tones and provide information to the backend controller, which the backend controller can used to locate the mobile device. For example, the mobile device can transmit timing, and possibly frequency, information about the tones it detects over the communication network 120 to a backend controller 130 that can determine the location of the mobile device based on this information and a known floor plan of the emitter locations. It is assumed that the timing of the backend controller and mobile devices is synchronized.

In one scenario, the mobile device can simply measure the time that it receives tones for two or more different emitters, and supply this timing information to the backend controller. The back end controller, knowing the time that it directed each emitter to send its burst can then determine the flight time to the mobile device for each tone, subtracting the two times to determine flight time. Using known trilateration techniques, then backend controller can then determined the location of the mobile device. In another scenario, the mobile device can measure the signal strength of received tones for two or more different emitters, and supply signal strength and timing information to the backend controller. The back end controller, knowing the time that it directed each emitter to send its burst can then determine the distance to the mobile device for each emitter's tone, closer emitters producing stronger tones. Using known trilateration techniques, then backend controller can then determined the location of the mobile device. It should be recognized that the particular frequencies of the tones could be changed during operation.

It may be that the backend controller loses accurate location information for one or more mobile device, even though those mobile devices can still communicate with the backend controller over the wireless connection. In order to re-establish a location for the lost device, the system will enter an "enrollment" mode, were devices can enroll for locationing by the backend controller. In particular, the backend controller will transmit an instruction over the wireless communication network to mobile devices within the environment to listen for an enrollment tone and respond when that device hears the enrollment tone.

Each emitter will emit the enrollment tone in a sequential manner. Specifically, a first emitter will emit the enrollment tone, then a second emitter will emit the enrollment tone, etc. until all the emitters in the environment have been cycled through or until the backend controller receives a response from the "lost" device(s). All the mobile devices that implemented the instruction to enter enrollment mode could respond to the backend controller when they receive the tone, but the controller could discard the responses from those devices that are not lost. Alternatively, the back end controller can address and direct (over the wireless network) the specific "lost" device(s) to listen for the enrollment tone while directing the other non-lost devices to ignore the enrollment tone. To avoid interference, emitters broadcast their tone sequentially so that neighboring regions do not emit their ultrasonic burst at the same time. However, emitters in non-neighboring regions could broadcast their ultrasonic burst at the same time. In one embodiment, the assigned enrollment tones are between 19 kHz and 22.05 kHz.

Each of the communication devices that implement the instruction to enter the enrollment mode and receive the enrollment tone can send a response back to the backend controller. The respective response including an identity (i.e. WLAN Media Access Control address) of the communication device, a time that the enrollment tone was received, and an indication of a hardware platform of the communication device. As the backend controller schedules the specific time when each emitter sends the enrollment tone, the timestamp in the response indicates which emitter broadcast the enrollment tone. Since the location of each emitter is known, the backend controller can use this to provide a rough location of the device—near that emitter. Alternatively, the emitters could be programmed to emit a unique set of frequencies in its burst, identifying that particular emitter. The set or the identity could be provided to the backend controller by the mobile device to establish the rough location of the device. After determining the rough location, the backend controller can then direct the mobile devices to leave enrollment mode and enter the locationing mode to provide finer locationing procedures.

To reduce interference, the backend controller can silence those emitters that are not identified by any of the received responses, and can also idle those communication devices that do not need locationing, e.g. those devices that did not respond to an enrollment tone or already having an establish accurate location. The backend controller can then assign a locationing mode to each responding communication device in accordance with the hardware platform of the respective communication device, in accordance with the present invention. Only involved devices and emitters are set to a locationing mode, i.e. the back end controller only turns on emitters that have enrolled mobile devices in range. In particular, the backend controller can activate the flight time cluster of emitters that are closest to the rough location of the device.

For example, if a device's hardware has the capability to perform more accurate flight time measurements, considering that some mobile devices support more accurate/higher refresh rate modes, then the backend controller can drive emitters indicated in the previous response to broadcast locationing tones for flight time measurements, and a flight time locationing mode can be used by that device to measure the timing of those locationing tones, and if a device's hardware only has the capability to perform less accurate signal strength measurements (i.e. received signal strength indicators or RSSI), then the backend controller can drive emitters indicated in the previous response to broadcast locationing tones for signal strength measurements, and a signal strength locationing mode can be used by that device to measure the signal strength of those locationing tones. If multiple communication devices responded to the enrollment tone of the same emitter with varying locationing mode capabilities, then the backend controller can individually-assigned a time-slice for each of those multiple communication devices to perform locationing using their own specific locationing mode. In this case, the period of each assigned time slice is dependent on the assigned locationing mode of the respective communication device, i.e. how long that device will need to perform the locationing measurements.

Each communication device can then perform its locationing measurements needed by the backend controller using its assigned locationing mode and locationing tones broadcast from emitters activated by the backend controller. The particular locationing tones used are dependent on the locationing mode. The locationing tones are emitted at a higher sound pressure level than the enrollment tones, typically 10-15 dB higher, in order to penetrate objects in the environment to provide a more accurate line-of-sight measurement instead of reflected or attenuated signals which would give inaccurate flight time or signal strength measurements. The locationing tones are between 19 kHz and 22.05 kHz as well such that the mobile device can utilizes existing audio circuitry. Emitters in non-neighboring regions could broadcast their locationing tones at the same time. In one embodiment, the locationing tones provide time-of-flight information for the communication device to use for locationing. In another embodiment, the locationing tones provide signal strength information for the communication device to use for locationing. The backend controller can then use standard trilateration techniques to determine the precise location of the mobile device.

It should be noted that the backend controller could change locationing modes for a particular device dependent upon communication system loading. For example, if the system becomes overloaded, a locationing mode with less communication overhead and/or accuracy could be substituted in order to keep position updates with predefined limits, i.e. signal strength measurements could be substituted for flight time measurements, or a fewer number of measurements could be used than is ideal, i.e. four RSSI measurements could be used instead of eight.

In one embodiment, the backend controller periodically performs enrollment mode and adapts the system configuration accordingly.

Referring back to FIG. 2, a specific example is shown of a top view of a retail store environment. Sixty emitters 110 are shown affixed to a ceiling of the store in a regular fifty-foot grid (although irregular placement could also be accommodated). There are seven mobile communication devices shown (MD 1-7). Emitters E1 to E3 are labeled for discussion purposes. Referring to emitter E1, circle A represents the ultrasonic range of E1, where a mobile device, such as MD 4, can recognize an enrollment tone in that range and let the backend controller known that MD 4 is roughly located within circle A.

Circle B is the area where E1 would cause severe flight time interference in locationing mode (which uses a higher SPL level of ultrasonic tones than enrollment mode) with adjacent areas requiring time slicing and/or different frequencies. Circle C (radius of about 110 feet) is the area where E1 would cause moderate flight time interference with adjacent areas requiring time slicing and/or different frequencies. Flight time accuracy is greatly dependent on identifying the first arriving signal. Therefore, increased SPL (or lowering the threshold on the Goertzel algorithm in the DSP) allows more penetration into areas with attenuators and many small reflectors (shelving, racks, clothing. etc). The key to accurate non-line-of-sight (NLOS) flight time measurements is penetration which comes from higher SPL. This implies that LOS signals will trip the Goertzel algorithm threshold at greater distances, which is why circle C is so large, affecting coverage areas of twenty adjacent emitters.

Testing of different smart phones (i.e. mobile devices) has shown that different hardware (and software) platforms provide different locationing performance. In particular, frequency response, audio buffer access, and operating system support for various ultrasonic locationing modes varies among different model smart phones. Designing a locationing mode to the lowest common denominator of performance is a poor approach. Therefore, the present invention assigns the locationing mode to be used in accordance with a platform type of the particular mobile device.

In operation, emitters within interference range of each other take turns sending an enrollment tone sequentially. Those emitters out of interference range could send an enrollment tone simultaneously as long as their positions are known separately. When a mobile device hears an enrollment tone, it responds with its identity, a timestamp when it heard the enrollment tone, and its hardware/software platform to the backend controller over the WLAN. In this example, the backend controller receives enrollment information indicating that devices MD 1-6 are all near each other and all have a hardware/software platform that is capable of flight time locationing. Since these devices are near to each other a "cluster" is set up by the back end controller of two or more (typically four) emitters near MD 1-6. The backend controller also receives enrollment information indicating that device MD 7 is not near MD 1-6 and has a hardware/software platform that is not capable of flight time locationing but is capable of six-tone signal strength measurements. Since MD 7 is not near to MD 1-6 its assigned locationing mode need not be time-sliced with the other and it can simply listen for locationing tones from a local cluster of six emitters near MD 7 in order to measure their signal strength. All other emitters (about fifty) are quiet during the locationing mode.

In this example, enrollment mode will take about one-half to one second. All the mobile devices benefit from maximum possible refresh rate and accuracy until one of the enrolled devices is unable to continue its current mode. The device then notifies the backend controller causing the controller to set up a new mode to service each device's locationing requirements. During locationing mode, those mobile devices that are using flight time measurements are expected to have a position update rate of about every 500 mS (two updates per second for three samples—averaging 1.5 seconds. Those mobile devices that are using signal strength measurements are expected to have a position update rate of about every two seconds with three samples—averaging 6 seconds. The enrollment mode can occur periodically to add phones to be serviced by the system, where the backend controller considers locations of the mobile devices after they have been accurately located to determine the set up for the next period.

Without the present invention, a blind time-sliced system would be used where none of the mobile devices are located, and all emitters are used one-by-one for locationing. For instance, a controller would need to command the following sequence to all emitters and phones in the store. The controller would first command all emitters and phones to an RSSI locationing mode, which would take up about six seconds to cycle through all devices. There would be two seconds for each of a three sample average to help with NLOS accuracy. The controller would then command all emitters and phones to a flight time locationing mode, which would take up about thirty-six seconds to cycle through all devices. Flight time would trigger four emitters at a time, sequenced across all emitters close enough to interfere with each other. As shown in circle C, there are about twenty-five emitters close enough to interfere, so the entire store could not be broken up into more than two or three circles the size of circle C, which results in about twenty-four adjacent groupings of four emitters each. Each flight time measurement would take about one-half second (100 mS to account for max flight time for 4 emitters+100 mS guard time). Using a three sample average would results in about thirty-six seconds to cycle through all devices. In addition, extra time would be needed to sequence the locationing modes for any mobile device hardware requiring additional locationing modes.

As can be seen, the present invention provides a much better position update rate than blind time-slicing. It should be noted that the present invention approaches the performance of a blind time-sliced technique when mobile devices of each known hardware type are in range of each of the sixty emitters, whereupon the controller would trade accuracy to keep position update rate in check.

Figure 3:
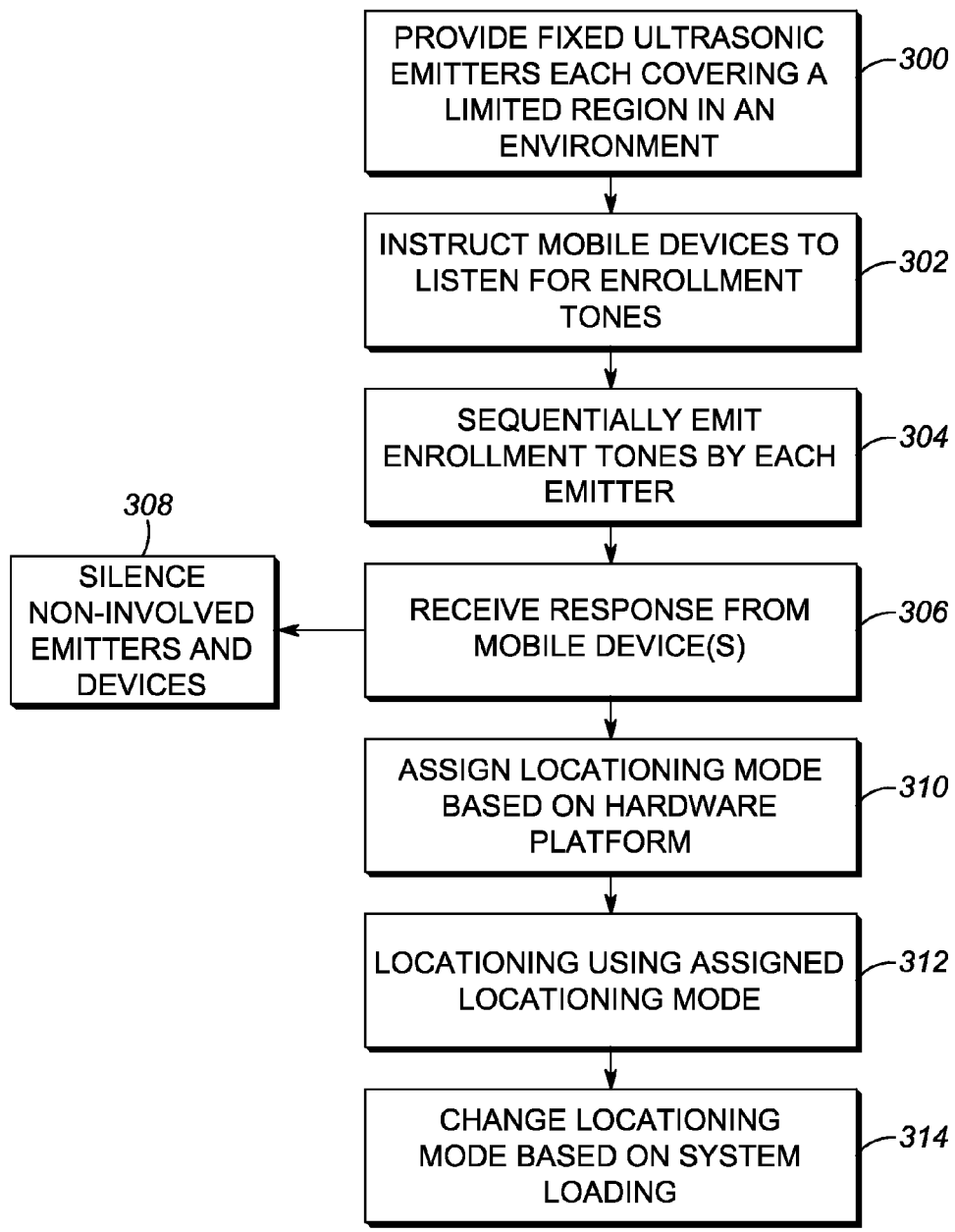
FIG. 3 is a flow diagram illustrating a method for ultrasonic locationing, in accordance with some embodiments of the present invention.

FIG. 3 is a flowchart illustrating a method of ultrasonic locationing of a mobile device within an environment, according to some embodiments of the present invention.

A first step 300 includes providing a plurality of fixed ultrasonic emitters within the environment such that an ultrasonic burst broadcast from each emitter is able to be detected by the mobile device within a limited region of the environment associated with that emitter. In particular, the emitters are affixed to a ceiling of the environment and oriented towards a floor of the environment to provide a limited region for communication devices to receive an enrollment tone.

A next step 302 includes transmitting an instruction by the backend controller over the communication network to mobile devices within the environment to listen for the enrollment tone.

A next step 304 includes sequentially emitting an enrollment tone from each emitter in the environment at specific times to be received by those communication devices that implemented the instruction from the previous step 302. To avoid interference, emitters broadcast their tone sequentially so that neighboring regions do not emit their ultrasonic burst at the same time. Emitters in non-neighboring regions could broadcast their ultrasonic burst at the same time where the non-neighboring regions are serviced by different access points of the communication network. In one embodiment, the assigned enrollment tones have a frequency between 19 kHz and 22.05 kHz.

A next step 306 includes receiving a response from each of those communication devices that implemented the instruction and received the enrollment tone. The respective response including an identity of the communication device, a time that the enrollment tone was received, and an indication of a hardware and software platform of the communication device.

Upon leaving the enrollment mode and entering a locationing mode, a next step 308 includes silencing those emitters that are not identified by any of the received responses, and idling those communication devices that that do not need locationing.

A next step 310 includes assigning a locationing mode to each responding communication device in accordance with the hardware/software platform of the respective communication device. If multiple communication devices are located within a same emitter region for locationing tones, this step includes an individually-assigned time-slice for each of those multiple communication devices to perform locationing 312. In this case, the period of each assigned time slice is dependent on the assigned locationing mode of the respective communication device.

A next step 312 includes locationing of each communication device using its assigned locationing mode and locationing tones from active emitters. The particular locationing tones used are dependent on the locationing mode. The locationing tones are emitted at a higher sound pressure level than the enrollment tones, e.g. 10-15 dB higher, up to a maximum available SPL from the emitters. The locationing tones are emitted from one or more emitter in a local group near the region of the emitter associated with the detected enrollment tone. Emitters in non-neighboring regions could broadcast their locationing tones at the same time. In one embodiment, the locationing tones provide time-of-flight information for the backend controller to use for locationing. In another embodiment, the locationing tones provide signal strength information for the backend controller to use for locationing. In one embodiment, the locationing tones have a frequency between 19 kHz and 22.05 kHz such that the mobile device measuring these tones utilizes existing, unmodified audio circuitry.

A next step 314 includes changing locationing modes dependent upon communication system loading. For example, if the system becomes overloaded, a locationing mode with less communication overhead and/or accuracy could be substituted for particular communication devices in order to maintain a certain position update rate.

The above steps can be repeated periodically to keep track of mobile devices moving within, entering, or leaving the environment.

Advantageously, the present invention provides an ultrasonic locationing system using a receiver running an existing audio codec running at a sample rate of 44.1 kHz, and audio microphone, and a digital signal processor, all of which are present in nearly every smart phone that is manufactured today. The present invention can be implemented using this existing hardware and a software app which could be downloaded and installed to use the existing hardware in the novel way described herein. The present invention provides a higher refresh rate than a typical locationing approach where emitters blindly emit energy into all regions of the coverage area, which requires time-slicing or having enough frequencies to prevent overlapping areas from interfering. The present invention is preferred over blindly time slicing between modes when the modes may not be used by any mobile device in range.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors or processing devices such as microprocessors, digital signal processors, customized processors and field programmable gate arrays and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits, in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc Read Only Memory, an optical storage device, a magnetic storage device, a Read Only Memory, a Programmable Read Only Memory, an Erasable Programmable Read Only Memory, an Electrically Erasable Programmable Read Only Memory, and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for ultrasonic locationing of a mobile device within an environment, the system comprising:
    a plurality of fixed ultrasonic emitters within the environment, the emitters operable to transmit an instruction to listen for an enrollment tone to at least one communication device located within the environment, and to sequentially emit the enrollment tone from each emitter in the environment at specific times to be received by those communication devices that implement the instruction;
    a controller coupled to the emitters, the controller operable to receive a response from each of those communication devices that implemented the instruction and received the enrollment tone, the respective response including an identity of the communication device, a time that the enrollment tone was received, and an indication of a hardware platform of the communication device, the controller also operable to assign a locationing mode to each responding communication device in accordance with the hardware platform of the respective communication device; and
    at least one communication device operable to provide locationing information using its assigned locationing mode and locationing tones from active emitters.

2. A method of ultrasonic locationing of a mobile device within an environment, the method comprising the steps of:
    providing a plurality of fixed ultrasonic emitters within the environment;
    transmitting an instruction to listen for an enrollment tone to at least one communication device located within the environment;
    sequentially emitting the enrollment tone from each emitter in the environment at specific times to be received by those communication devices that implemented the instruction;
    receiving a response from each of those communication devices that implemented the instruction and received the enrollment tone, the respective response including an identity of the communication device, a time that the enrollment tone was received, and an indication of a hardware platform of the communication device;
    assigning a locationing mode to each responding communication device in accordance with the hardware platform of the respective communication device; and
    locationing of each communication device using its assigned locationing mode and locationing tones from active emitters.

3. The method of claim 2, further comprising the step of silencing those emitters that are not identified by any of the received responses.

4. The method of claim 3, where the silencing step also includes idling those communication devices that do not need locationing.

5. The method of claim 2, wherein if multiple communication devices are located within a same emitter region for locationing tones, the assigning step includes an individually-assigned time-slice for each of those multiple communication devices to perform locationing.

6. The method of claim 2, wherein if multiple communication devices are located within a same emitter region for locationing tones with varying mode capabilities, the assigning step includes an individually-assigned time-slice for each of those mode capabilities.

7. The method of claim 6, wherein the period of each assigned time slice is dependent on the assigned locationing mode of the respective communication device.

8. The method of claim 2, where in the providing step the emitters are affixed to a ceiling of the environment and oriented towards a floor of the environment to provide a limited region for communication devices to receive the enrollment tone.

9. The method of claim 8, where in the emitting and locationing steps emitters in non-neighboring regions emit their tones at the same time.

10. The method of claim 2, where in the emitting and locationing steps the tones utilized have a frequency between 19 kHz and 22.05 kHz and the mobile device utilizes existing, unmodified audio circuitry for the locationing step.

11. The method of claim 2, wherein in the locationing step the particular locationing tones used are dependent on the locationing mode.

12. The method of claim 11, wherein the locationing tones are emitted at a higher sound pressure level than the enrollment tones.

13. The method of claim 11, wherein the locationing tones provide time-of-flight information used for locationing.

14. The method of claim 11, wherein the locationing tones provide signal strength information used for locationing.

15. The method of claim 2, further comprising the step of changing locationing modes dependent upon communication system loading.

16. The method of claim 2, further comprising the step of changing locationing modes in response to a desired accuracy versus a position update rate.

17. The method of claim 2, wherein the steps of the method are repeated periodically.

* * * * *